(12) United States Patent
Shimabayashi et al.

(10) Patent No.: US 12,731,738 B2
(45) Date of Patent: Sep. 8, 2026

(54) SWITCH

(71) Applicant: Mitsubishi Electric Corporation, Tokyo (JP)

(72) Inventors: Keita Shimabayashi, Tokyo (JP); Shinichiro Nakauchi, Tokyo (JP); Masato Kubota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 220 days.

(21) Appl. No.: 18/727,513

(22) PCT Filed: Apr. 4, 2022

(86) PCT No.: PCT/JP2022/017046
§ 371 (c)(1),
(2) Date: Jul. 9, 2024

(87) PCT Pub. No.: WO2023/195045
PCT Pub. Date: Oct. 12, 2023

(65) Prior Publication Data

US 2025/0079093 A1 Mar. 6, 2025

(51) Int. Cl.
*H01H 3/26* (2006.01)
*H01H 3/36* (2006.01)
(Continued)

(52) U.S. Cl.
CPC ................ *H01H 3/26* (2013.01); *H01H 3/36* (2013.01); *H01H 3/40* (2013.01); *H02B 13/035* (2013.01)

(58) Field of Classification Search
CPC .. H01H 3/26; H01H 3/36; H01H 3/40; H01H 31/003; H01H 33/36; H01H 33/42; H01H 9/262; H02B 13/035; H02B 13/075
See application file for complete search history.

(56) References Cited

U.S. PATENT DOCUMENTS

2009/0120907 A1* 5/2009 Girodet ................ H01H 33/122 218/5
2016/0268069 A1* 9/2016 Kobayashi ............... H01H 3/26
2020/0219687 A1 7/2020 Ogiya et al.

FOREIGN PATENT DOCUMENTS

JP H06197423 A 7/1994
JP 2006296062 A 10/2006
WO 2019064447 A1 4/2019

OTHER PUBLICATIONS

International Search Report (PCT/ISA/210) with translation and Written Opinion (PCT/ISA/237) mailed on Jun. 14, 2022, by the Japanese Patent Office as the International Searching Authority for International Application No. PCT/JP2022/017046. (8 pages).

* cited by examiner

*Primary Examiner* — Timothy J Thompson
*Assistant Examiner* — Rhadames Alonzo Miller
(74) *Attorney, Agent, or Firm* — BUCHANAN, INGERSOLL & ROONEY PC

(57) ABSTRACT

A switch includes: a circuit breaker; a disconnector; a grounding switch; and a manipulator that drives the disconnector and the grounding switch. The manipulator includes: a motor; a plurality of drive pulleys installed on an output shaft of the motor; and a controller for controlling rotation of the motor. Each of the disconnector and the grounding switch includes a switching manipulator that performs a switching action according to rotation of a driven pulley. A wire for transmitting torque of the motor is stretched around each of the drive pulleys and corresponding one of the driven pulleys. Each drive pulley includes: a mover having a catch that engages with the output shaft; and a chuck having a mover and a driver, the catch being engaged with the output shaft in the engaged state. The controller exclu- (Continued)

sively brings one of the plurality of drive pulleys into the engaged state.

5 Claims, 6 Drawing Sheets

(51) Int. Cl.
*H01H 3/40* (2006.01)
*H02B 13/035* (2006.01)

SWITCH

FIELD

The present disclosure relates to a switch that opens or closes an electric circuit.

BACKGROUND

A disconnector or an opener-closer to be applied to a switch that opens or closes an electric circuit, such as a gas-insulated switch, performs a switching action by torque transmitted from a manipulator including a motor. A pulley is installed in each of the disconnector or the opener-closer and the manipulator, and torque is transmitted from the manipulator to the disconnector or the opener-closer by a wire cable stretched around the pulleys. Thus, a switching action is performed by the disconnector or the opener-closer. The disconnector or the opener-closer and the manipulator are connected on a one-to-one basis. Therefore, it is necessary to provide manipulators equal in number to disconnectors or opener-closers. In a case where, for example, a gas-insulated switch includes a total of five components including grounding switches, as a type of opener-closer, and disconnectors, it is necessary to allow space for installation of five manipulators.

Patent Literature 1 discloses a gas-insulated switch that drives a plurality of disconnectors and grounding switches with a single manipulator. The gas-insulated switch disclosed in Patent Literature 1 can reduce space to install the manipulator as compared with a gas-insulated switch in which manipulators of the same number as disconnectors and grounding switches are installed.

CITATION LIST

Patent Literature

Patent Literature 1: Japanese Patent Application Laid-open No. 2006-296062.

SUMMARY OF INVENTION

Problem to be Solved by the Invention

In the gas-insulated switch disclosed in Patent Literature 1, the number of manipulators is reduced. However, in the gas-insulated switch disclosed in Patent Literature 1, it is necessary to use a manipulator including a high-power motor capable of simultaneously driving respective pulleys of the plurality of disconnectors and grounding switches.

The present disclosure has been made in view of the above, and an object of the present disclosure is to provide a switch that does not require a manipulator including a high-power motor capable of simultaneously driving a plurality of pulleys and that suppresses an increase in space to install a manipulator as compared with a case where a manipulator is installed individually for a disconnector and a switch.

Means to Solve the Problem

In order to solve the above-described problem and achieve the object, a switch according to the present disclosure includes: a circuit breaker configured to open or close a power transmission circuit; a disconnector configured to disconnect a part of the power transmission circuit; a grounding switch configured to ground the part of the power transmission circuit disconnected by the disconnector; and a manipulator configured to drive the disconnector and the grounding switch. The manipulator includes: a motor; a plurality of drive pulleys installed on an output shaft of the motor; and a controller configured to control rotation of the motor. Each of the disconnector and the grounding switch includes: a driven pulley; and a switching manipulator configured to perform a switching action according to rotation of the driven pulley. A wire, configured to transmit torque of the motor, is stretched around each of the drive pulleys and corresponding one of the driven pulleys. Each of the plurality of drive pulleys includes: a mover including a catch configured to engage with the output shaft; and a chuck including a driver configured to cause the mover to move between a position at which the catch is in an engaged state and a position at which the catch is in a disengaged state. The catch is engaged with the output shaft in the engaged state, and is out of contact with the output shaft in the disengaged state. The controller is configured to exclusively bring one of the plurality of drive pulleys into the engaged state.

Effects of the Invention

The present disclosure has an effect of providing a switch that does not require a manipulator including a high-power motor capable of simultaneously driving a plurality of pulleys and that suppresses an increase in space to install a manipulator as compared with a case where a manipulator is installed separately for a disconnector and a switch.

DESCRIPTION OF EMBODIMENTS

Hereinafter, switches according to embodiments will be described in detail with reference to the drawings.

First Embodiment

Figure 1:
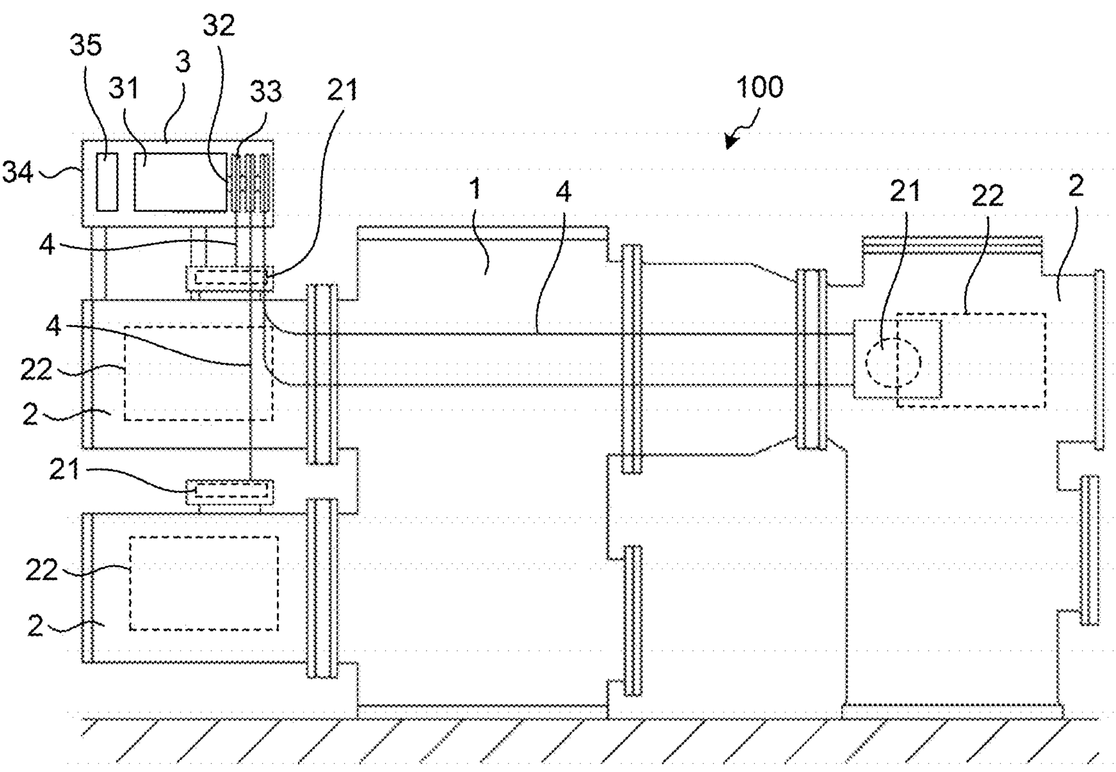
FIG. 1 is a side view of a switch according to a first embodiment.

FIG. 1 is a side view of a switch according to a first embodiment. A gas-insulated switch 100, which is a switch according to the first embodiment, includes: a circuit breaker 1 that opens or closes a power transmission circuit; a plurality of disconnectors 2; and a manipulator 3 that drives the disconnectors 2. Note that, in FIG. 1, one surface of a housing 34 of the manipulator 3 is not illustrated so as to illustrate the inside of the housing 34. The disconnector 2 disconnects a part of the power transmission circuit when the power transmission circuit is in an unloaded state. The disconnector 2 is a disconnector including a grounding switch that grounds the disconnected part of the power transmission circuit. The manipulator 3 includes a motor 31 to cause the disconnector 2 to perform a switching action. A plurality of drive pulleys 33 are provided on an output shaft 32 of the motor 31. In addition, each of the plurality of disconnectors 2 includes: a driven pulley 21 to which torque of the drive pulley 33 is transmitted; and a switching manipulator 22 configured to perform a switching action according to rotation of the driven pulley 21. A wire 4 is stretched around each of the drive pulleys 33 and corresponding one of the driven pulleys 21. Note that, here, the structure in which the disconnector 2 is a disconnector including a grounding switch is taken as an example, but a grounding switch may be installed separately from the disconnector 2.

Figure 2:
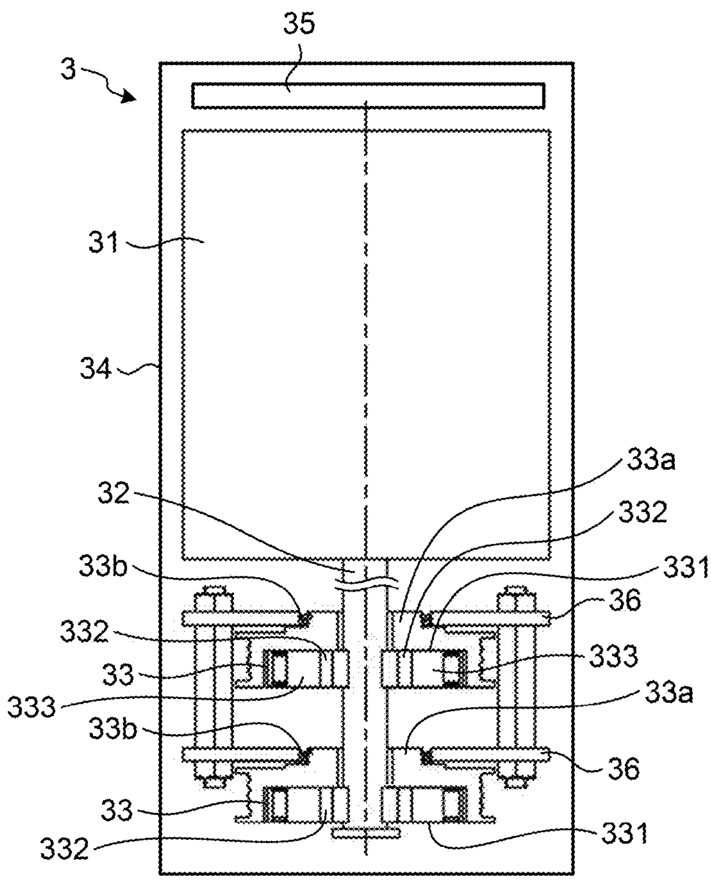
FIG. 2 is a top view of a manipulator included in the switch according to the first embodiment.

FIG. 2 is a top view of the manipulator included in the switch according to the first embodiment. Note that FIG. 2 illustrates only two of the drive pulleys 33 installed on the output shaft 32 of the motor 31. The manipulator 3 includes the housing 34 that accommodates the motor 31 and the drive pulleys 33. A controller 35 that controls rotation of the motor 31 is installed inside the housing 34.

The manipulator 3 includes mounting plates 36 that each supports the drive pulley 33. A shaft portion **33*a* is formed on each drive pulley 33. Each drive pulley 33 is rotatably supported by the shaft portion 33*a* being supported by the mounting plate 36 via a bearing 33*b***.

Figure 3:
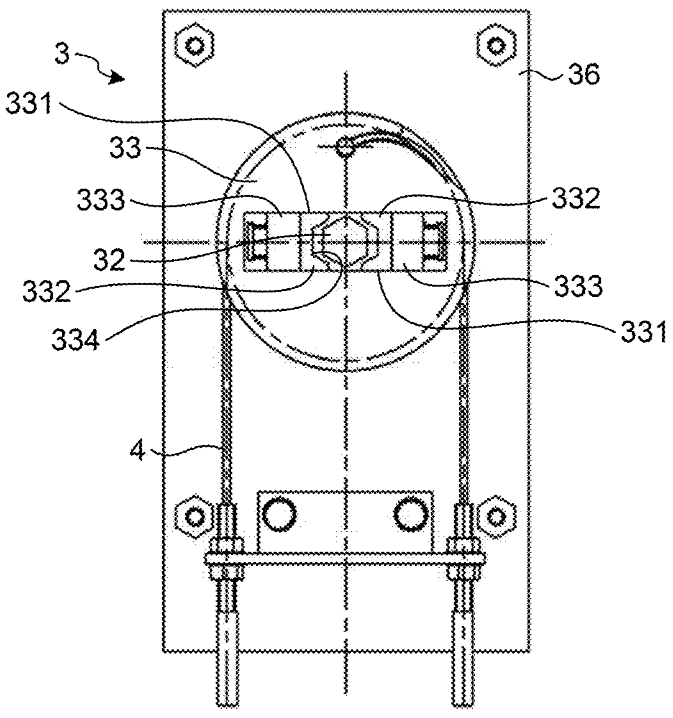
FIG. 3 is a front view of a drive pulley of the manipulator included in the switch according to the first embodiment, the drive pulley being in a disengaged state.
Figure 4:
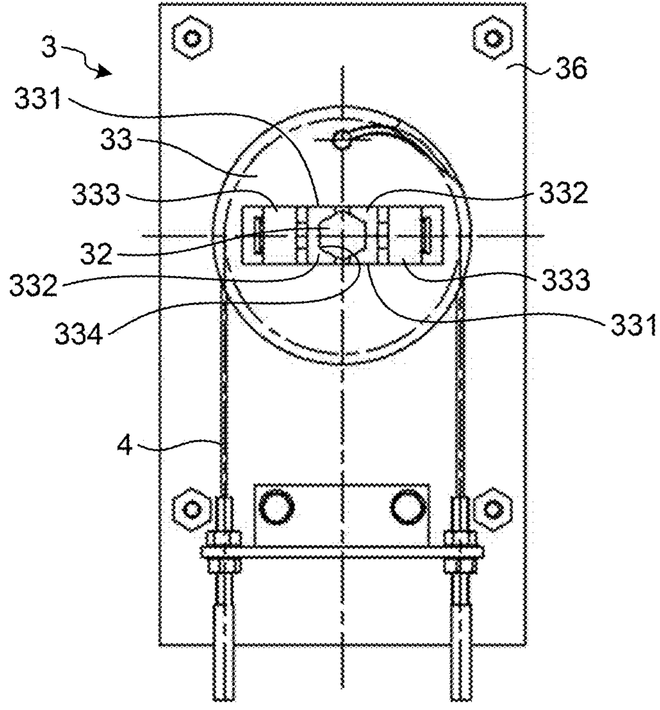
FIG. 4 is a front view of the drive pulley of the manipulator included in the switch according to the first embodiment, the drive pulley being in an engaged state.

FIG. 3 is a front view of the drive pulley of the manipulator included in the switch according to the first embodiment, the drive pulley being in a disengaged state. FIG. 4 is a front view of the drive pulley of the manipulator included in the switch according to the first embodiment, the drive pulley being in an engaged state. The output shaft 32 of the motor 31 is hexagonal in cross section. The drive pulley 33 includes a chuck 331. The chuck 331 includes: two movers 332 being arranged with the output shaft 32 of the motor 31 interposed therebetween; and solenoids 333 that moves the movers 332.

A catch 334 which is a groove-like portion to be engaged with the output shaft 32 of the motor 31 is formed in each of the movers 332. The solenoids 333 cause the two movers 332 to move along a direction in which the movers 332 are arranged. When the movers 332 come into contact with an outer peripheral surface of the output shaft 32 and thus, the outer peripheral surface of the output shaft 32 is engaged with the catches 334, the torque of the output shaft 32 is transmitted to the drive pulley 33 to cause the drive pulley 33 to rotate in accordance with rotation of the output shaft 32. When the movers 332 are separated from the output shaft 32 and thus, the outer peripheral surface of the output shaft 32 is disengaged from the catches 334, the torque of the output shaft 32 is not transmitted to the drive pulley 33. Thus, the drive pulley 33 does not rotate even if the output shaft 32 rotates. Here, an "engaged state" refers to a state of the drive pulley 33 in which the catches 334 of the movers 332 are engaged with the outer peripheral surface of the output shaft 32. Furthermore, a "disengaged state" refers to a state of the drive pulley 33 in which the catches 334 of the movers 332 are separated from the outer peripheral surface of the output shaft 32. Therefore, the solenoid 333 is a driver that causes the mover 332 to move between a position where the catch 334 is in the engaged state, in which the catch 334 is engaged with the output shaft 32, and a position where the catch 334 is in the disengaged state, in which the catch 334 is out of contact with the output shaft 32. Note that, here, a configuration in which the solenoid 333 is a driver for moving the mover 332 is taken as an example, but the driver is not limited to the solenoid 333.

The controller 35 controls the solenoids 333 of each drive pulley 33. Note that, illustration of lines connecting the controller 35 and the solenoids 333 has been omitted from FIGS. 2, 3, and 4. The controller 35 normally brings all the drive pulleys 33 into the disengaged state, and exclusively brings any one of the drive pulleys 33 into the engaged state when causing the disconnector 2 to perform a switching action. Therefore, the output shaft 32 does not simultaneously rotate the plurality of drive pulleys 33. Therefore, the manipulator 3 does not need to be a large device including a high-power motor 31 that simultaneously rotates the plurality of drive pulleys 33. Therefore, the gas-insulated switch 100, which is the switch according to the first embodiment, can suppress an increase in space to install the manipulator 3.

Note that when the movers 332 of any one of the drive pulleys 33 are released from the engaged state and brought into the disengaged state, bottom surfaces of the grooves of the catches 334 of the movers 332 of all the drive pulleys 33 face flat-surface portions of the outer peripheral surface of the output shaft 32. Therefore, after the any one of the drive pulleys 33 is brought into the disengaged state, it is possible to bring any desired drive pulley 33 into the engaged state without rotating the output shaft 32.

Second Embodiment

Figure 5:
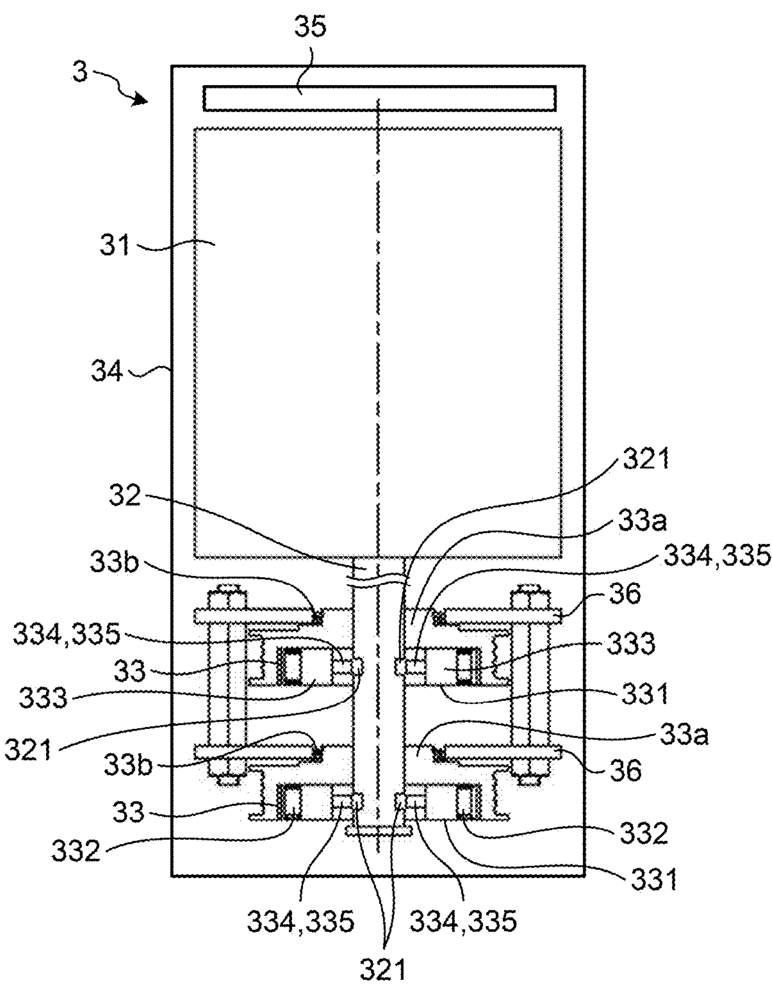
FIG. 5 is a top view of a manipulator included in a switch according to a second embodiment.

FIG. 5 is a top view of a manipulator included in a switch according to a second embodiment. In the manipulator 3 of the gas-insulated switch 100 serving as the switch according to the second embodiment, a pin 335 formed on each mover 332 of the chuck 331 serves as the catch 334. In addition, holes 321 into which the pins 335 can be inserted are formed in the output shaft 32 of the motor 31. The holes 321 are formed at intervals of 180° around the axis of the output shaft 32. Furthermore, the holes 321 are formed side by side in an axial direction of the output shaft 32 in accordance with arrangement positions of a plurality of the drive pulleys 33. In the axial direction of the output shaft 32, positions where the holes 321 are formed correspond to positions where the drive pulleys 33 are installed. Except for this point, the configuration of the gas-insulated switch 100 of the second embodiment is similar to the configuration of the gas-insulated switch 100 according to the first embodiment. Therefore, description of common points are omitted.

Figure 6:
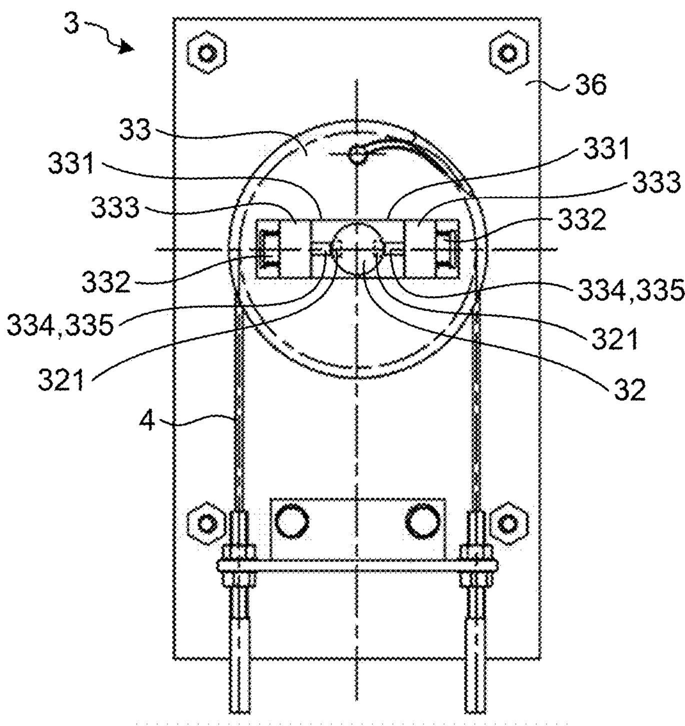
FIG. 6 is a front view of a drive pulley of the manipulator included in the switch according to the second embodiment, the drive pulley being in a disengaged state.
Figure 7:
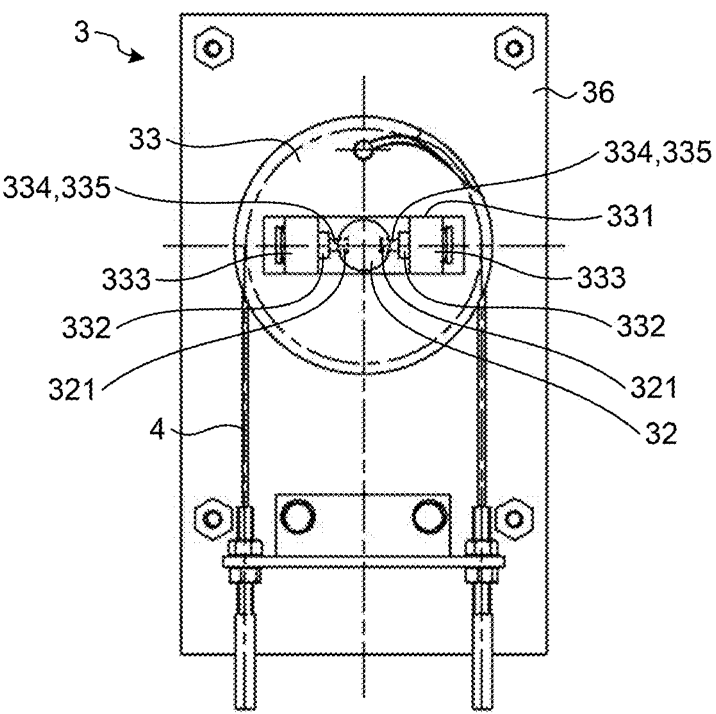
FIG. 7 is a front view of the drive pulley of the manipulator included in the switch according to the second embodiment, the drive pulley being in an engaged state.

FIG. 6 is a front view of the drive pulley of the manipulator included in the switch according to the second embodiment, the drive pulley being in a disengaged state. FIG. 7 is a front view of the drive pulley of the manipulator included in the switch according to the second embodiment, the drive pulley being in an engaged state. The output shaft 32 of the motor 31 is circular in cross section. The solenoids 333 cause the two movers 332 to move along a direction in which the movers 332 are arranged. When the movers 332 come into contact with the output shaft 32 and thus, the pins 335 serving as the catches 334 are inserted into the holes 321 of the output shaft 32, the torque of the output shaft 32 is transmitted to the drive pulley 33 to cause the drive pulley 33 to rotate according to rotation of the output shaft 32.

When the movers 332 are separated from the output shaft 32 and thus, the pins 335 serving as the catches 334 come out of the holes 321 of the output shaft 32, the torque of the output shaft 32 is not transmitted to the drive pulley 33. Thus, the drive pulley 33 does not rotate even if the output shaft 32 rotates. Here, an "engaged state" refers to a state of the drive pulley 33 in which the pins 335 of the movers 332 are inserted in the holes 321 of the output shaft 32. In addition, a "disengaged state" refers to a state of the drive pulley 33 in which the pins 335 of the movers 332 have come out of the holes 321 of the output shaft 32.

The controller 35 controls the solenoids 333 of each drive pulley 33. Note that, illustration of lines connecting the controller 35 and the solenoids 333 has been omitted from FIGS. 5, 6, and 7. The controller 35 normally brings all the drive pulleys 33 into the disengaged state, and exclusively brings any one of the drive pulleys 33 into the engaged state when causing the disconnector 2 to perform a switching action. Therefore, the output shaft 32 does not simultaneously rotate the plurality of drive pulleys 33. Therefore, the manipulator 3 does not need to be a large device with power output for simultaneously rotating the plurality of drive pulleys 33. Therefore, the gas-insulated switch 100 according to the second embodiment can suppress an increase in space to install the manipulator 3.

Note that since the holes 321 of the output shaft 32 are formed side by side in the axial direction of the output shaft 32 in accordance with the arrangement positions of the drive pulleys 33, when the pins 335 of the movers 332 of any one of the drive pulleys 33 are pulled out from the holes 321, the pins 335 of the movers 332 of all the drive pulleys 33 face the holes 321 of the output shaft 32. Therefore, after the any one of the drive pulleys 33 is brought into the disengaged state, it is possible to bring any desired drive pulley 33 into the engaged state without rotating the output shaft 32.

Note that although the chuck 331 includes a pair of the movers 332 in the above description, the chuck 331 may have a structure including a stator and the mover 332. In this case, a single solenoid 333 just needs to be provided so as to move the mover 332. When using the chuck 331 including the stator and the mover 332, it is possible to cause the catches 334 to be engaged with the output shaft 32 by moving the mover 332 with the solenoid 333 to press the output shaft 32 against the stator such that the output shaft 32 is sandwiched between the mover 332 and the stator.

Figure 8:
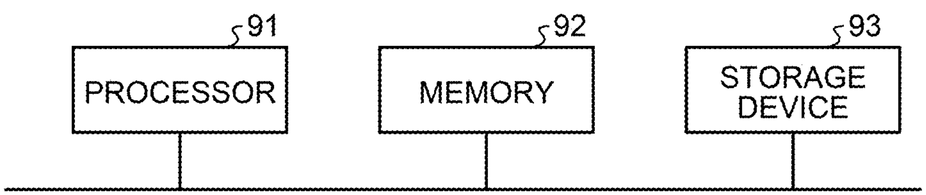
FIG. 8 is a diagram illustrating a hardware exemplary configuration of each controller of the switches according to the first and second embodiments.

Next, a description will be given of a hardware configuration of the controller 35 of the manipulator 3 included in the gas-insulated switch 100 that is the switch according to each of the first and second embodiments described above. FIG. 8 is a diagram illustrating a hardware exemplary configuration of each controller of the switches according to the first and second embodiments. FIG. 8 illustrates a hardware configuration to be adopted when functions of the controller 35 are implemented by use of hardware that executes programs.

The controller 35 includes: a processor 91 that executes various types of processing; a memory 92 as a main memory; and a storage 93 that stores information. The processor 91 may be an arithmetic means such as an arithmetic unit, a microprocessor, a microcomputer, a central processing unit (CPU), or a digital signal processor (DSP). Furthermore, it is possible to use, as the memory 92, a nonvolatile or volatile semiconductor memory such as a random access memory (RAM), a read only memory (ROM), a flash memory, an erasable programmable read only memory (EPROM), or an electrically erasable programmable read only memory (EEPROM (registered trademark)). The storage 93 stores programs for controlling the motor 31 and controlling the solenoids 333 of the drive pulleys 33. The processor 91 reads the programs stored in the storage 93 into the memory 92, and executes the programs. The functions of the controller 35 are implemented by the processor 91 reading the programs stored in the storage 93 into the memory 92 and executing the programs.

The configurations set forth in the above embodiments show examples of the subject matter, and it is possible to combine the configurations with another known technique, and is also possible to partially omit or change the configurations without departing from the scope of the present disclosure.

REFERENCE SIGNS LIST

1 circuit breaker; 2 disconnector; 3 manipulator; 4 wire; 21 driven pulley; 22 switching manipulator; 31 motor; 32 output shaft; 33 drive pulley; **33*a* shaft portion; 33*b* bearing; 34 housing; 35 controller; 36 mounting plate; 91 processor; 92 memory; 93 storage; 100 gas-insulated switch; 321 hole; 331 chuck; 332 mover; 333 solenoid; 334 catch; 335** pin.

The invention claimed is:

1. A switch comprising:
a circuit breaker configured to open or close a power transmission circuit;
a disconnector configured to disconnect a part of the power transmission circuit;
a grounding switch configured to ground the part of the power transmission circuit disconnected by the disconnector; and
a manipulator configured to drive the disconnector and the grounding switch, wherein the manipulator includes:
a motor;
a plurality of drive pulleys installed on an output shaft of the motor; and
a controller configured to control rotation of the motor, wherein each of the disconnector and the grounding switch includes:
a driven pulley; and
a switching manipulator configured to perform a switching action according to rotation of the driven pulley, wherein
a wire, configured to transmit torque of the motor, is stretched around each of the drive pulleys and corresponding one of the driven pulleys, wherein
each of the plurality of drive pulleys includes:
a mover including a catch configured to engage with the output shaft; and
a chuck including a driver configured to cause the mover to move between a position at which the catch is in an engaged state and a position at which the catch is in a disengaged state, wherein
the catch is engaged with the output shaft in the engaged state, and is out of contact with the output shaft in the disengaged state, and
the controller is configured to exclusively bring one of the plurality of drive pulleys into the engaged state.

2. The switch according to claim 1, wherein
the output shaft is a shaft with a polygonal cross section, and
the catch includes a groove configured to engage with a corner of an outer peripheral surface of the output shaft.

3. The switch according to claim 1, wherein a plurality of holes are formed in an outer peripheral surface of the output shaft, the plurality of holes corresponding to installation positions of the plurality of drive pulleys, and the catch of each of the plurality of drive pulleys has a protrusion that can be inserted into the hole.

4. The switch according to claim 3, wherein the plurality of holes are formed side by side in an axial direction of the output shaft.

5. The switch according to claim 1, wherein the chuck is configured to hold the output shaft by means of the movers from two directions opposite to each other, the two directions being perpendicular to the output shaft.

* * * * *